United States Patent [19]
Geis et al.

[11] Patent Number: 6,020,713
[45] Date of Patent: Feb. 1, 2000

[54] TURBOGENERATOR/MOTOR PULSE WIDTH MODULATED CONTROLLER

[75] Inventors: Everett R. Geis, Trabuco Canyon; Brian W. Peticolas, Redondo Beach; Joel B. Wacknov, Monrovia, all of Calif.

[73] Assignee: Capstone Turbine Corporation, Woodland Hills, Calif.

[21] Appl. No.: 09/002,890

[22] Filed: Jan. 5, 1998

[51] Int. Cl.[7] .................................................... H02P 7/00
[52] U.S. Cl. ............................ 318/801; 318/139; 318/811
[58] Field of Search ............................. 318/139, 799–816; 322/90

[56] References Cited

U.S. PATENT DOCUMENTS

| | | |
|---|---|---|
| 3,426,224 | 2/1969 | Esters . |
| 3,512,074 | 5/1970 | Soper . |
| 3,719,844 | 3/1973 | Easton . |
| 3,949,253 | 4/1976 | Broadway et al. . |
| 4,015,187 | 3/1977 | Sasaki et al. .............................. 322/14 |
| 4,127,787 | 11/1978 | Auinger . |
| 4,451,751 | 5/1984 | Auinger . |
| 4,550,267 | 10/1985 | Vaidya . |
| 4,642,498 | 2/1987 | Archibald et al. . |
| 4,730,397 | 3/1988 | Campbell et al. .......................... 322/7 |
| 4,806,812 | 2/1989 | Masterman . |
| 5,057,763 | 10/1991 | Torii ........................................... 322/8 |
| 5,214,371 | 5/1993 | Naidu ....................................... 322/29 |
| 5,376,852 | 12/1994 | Kawamura et al. . |
| 5,510,696 | 4/1996 | Naidu et al. .............................. 322/29 |

*Primary Examiner*—Jonathan Salata
*Attorney, Agent, or Firm*—Albert J. Miller

[57] ABSTRACT

A controller for a permanent magnet turbogenerator/motor having a pulse width modulated inverter and a rectifier bridge. The pulse width modulated inverter includes a positive section magnetic winding and a separate equal negative section magnetic winding, and the inverter has a positive section connected to the positive section magnetic winding of the pulse width modulated inverter and a negative section connected to the separate negative section magnetic winding of the pulse width modulated inverter.

6 Claims, 4 Drawing Sheets

TURBOGENERATOR/MOTOR PULSE WIDTH MODULATED CONTROLLER

TECHNICAL FIELD

This invention relates to the general field of inverters and more particularly to an improved inverter configuration for a generator/motor.

BACKGROUND OF THE INVENTION

A permanent magnet generator/motor generally includes a rotor assembly having a plurality of equally spaced magnet poles of alternating polarity around the outer periphery of the rotor or, in more recent times, a solid structure of samarium cobalt or neodymium-iron-boron. The rotor is rotatable within a stator which generally includes a plurality of windings and magnetic poles of alternating polarity. In a generator mode, rotation of the rotor causes the permanent magnets to pass by the stator poles and coils and thereby induces an electric current to flow in each of the coils. Alternately, if an electric current is passed through the stator coils, the energized coils will cause the rotor to rotate and thus the generator will perform as a motor.

As high energy product permanent magnets having significant energy increases have become available at reduced prices, the utilization of the permanent magnet generator/motors has increased. Samarium cobalt permanent magnets having an energy product of twenty-seven (27) megagauss-oersted (mgo) are now readily available and neodymium-iron-boron magnets with an energy product of thirty-five (35) megagauss-oersted are also available. Even further increases of mgo to over 45 megagauss-oersted promise to be available soon. The use of such high energy product permanent magnets permits increasingly smaller machines capable of supplying increasingly higher power outputs.

One of the applications of a permanent magnet generator/motor is referred to as a turbogenerator which includes a power head mounted on the same shaft as the permanent magnet generator/motor, and also includes a combustor and recuperator. The turbogenerator power head would normally include a compressor, a gas turbine and a bearing rotor through which the permanent magnet generator/motor tie rod passes. The compressor is driven by the gas turbine which receives heated exhaust gases from the combustor supplied with preheated air from recuperator.

In order to start the turbogenerator, electric current is supplied to the stator coils of the permanent magnet generator/motor to operate the permanent magnet generator/motor as a motor and thus to accelerate the gas turbine of the turbogenerator. During this acceleration, spark and fuel are introduced in the correct sequence to the combustor and self-sustaining gas turbine conditions are reached.

At this point, the inverter is disconnected from the permanent magnet generator/motor, reconfigured to a controlled 60 hertz mode, and then either supplies regulated 60 hertz three phase voltage to a stand alone load or phase locks to the utility, or to other like controllers, to operate as a supplement to the utility. In this mode of operation, the power for the inverter is derived from the permanent magnet generator/motor via high frequency rectifier bridges. A microprocessor can monitor turbine conditions and control fuel flow to the gas turbine combustor.

In order to produce three phase, four wire utility grade power from the turbogenerator, there must be allowance for single phase loads. In order to accomplish this, the turbogenerator power converter must include an inverter which has a neutral. One way that pulse width modulated inverters establish a neutral is by providing a fourth channel of Integrated Gate Bipolar Transistors (IGBT) switches and associated gate drives and output filter inductor. By switching the IGBT's in this fourth channel to a fifty percent (50%) duty cycle, an artificial neutral connection is created which is exactly at the mid point of the DC bus potential.

An example of such a system is described in U.S. patent application Ser. No. 924,966, filed Sep. 8, 1997 (issued May 5, 1999 as U.S. Pat. No. 5,903,116) by Everett R. Geis and Brian W. Peticolas entitled "Turbogenerator/Motor Controller", assigned to the same assignee as this application and incorporated herein by reference. While this approach to establish a neutral is quite functional, its cost in increased components, such as the solid state transistors, associated gate drives, and output filter inductor, makes such a system relatively expensive to produce.

SUMMARY OF THE INVENTION

In the present invention, the permanent magnet generator winding is split into two equal windings with each of the two windings connected to a separate three phase rectifier block of a pulse width modulated inverter. The pulse width modulated inverter includes three (3) IGBT channels across the voltage bus with the neutral created between the separate three phase rectifier blocks.

BRIEF DESCRIPTION OF THE DRAWINGS

Figure 1:
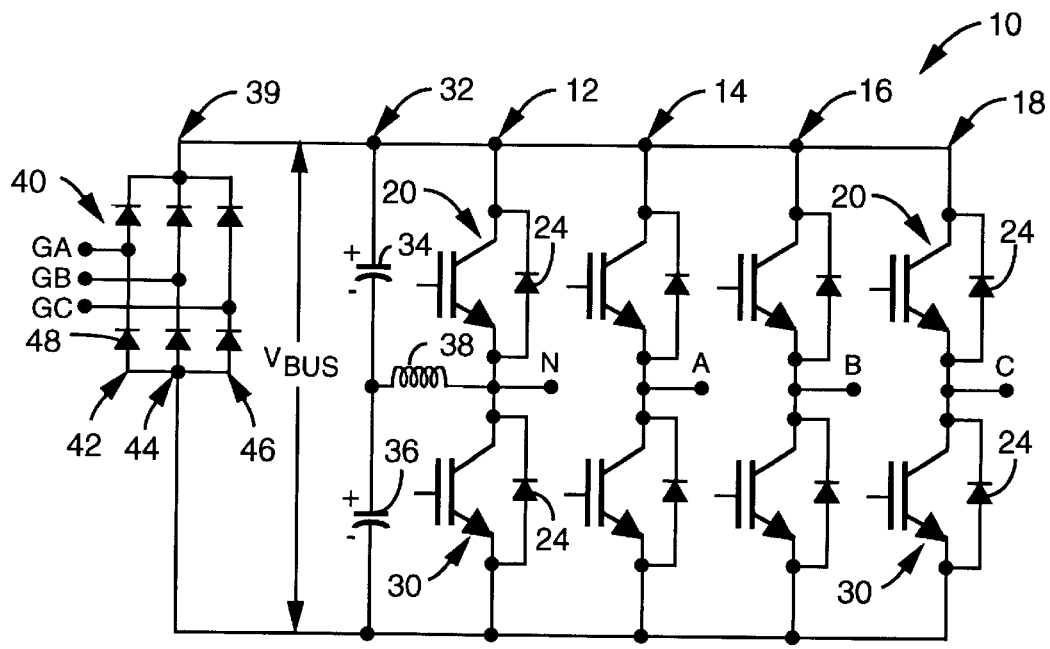
Figure 2:
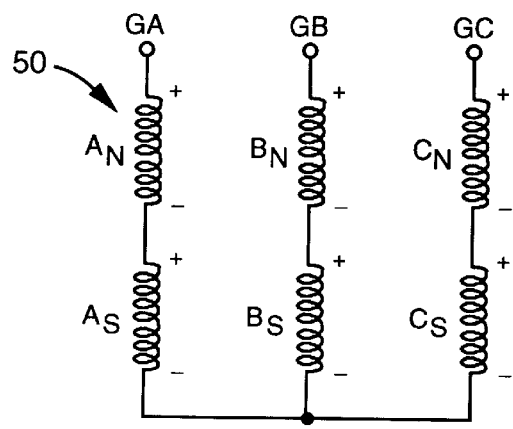
Figure 3:
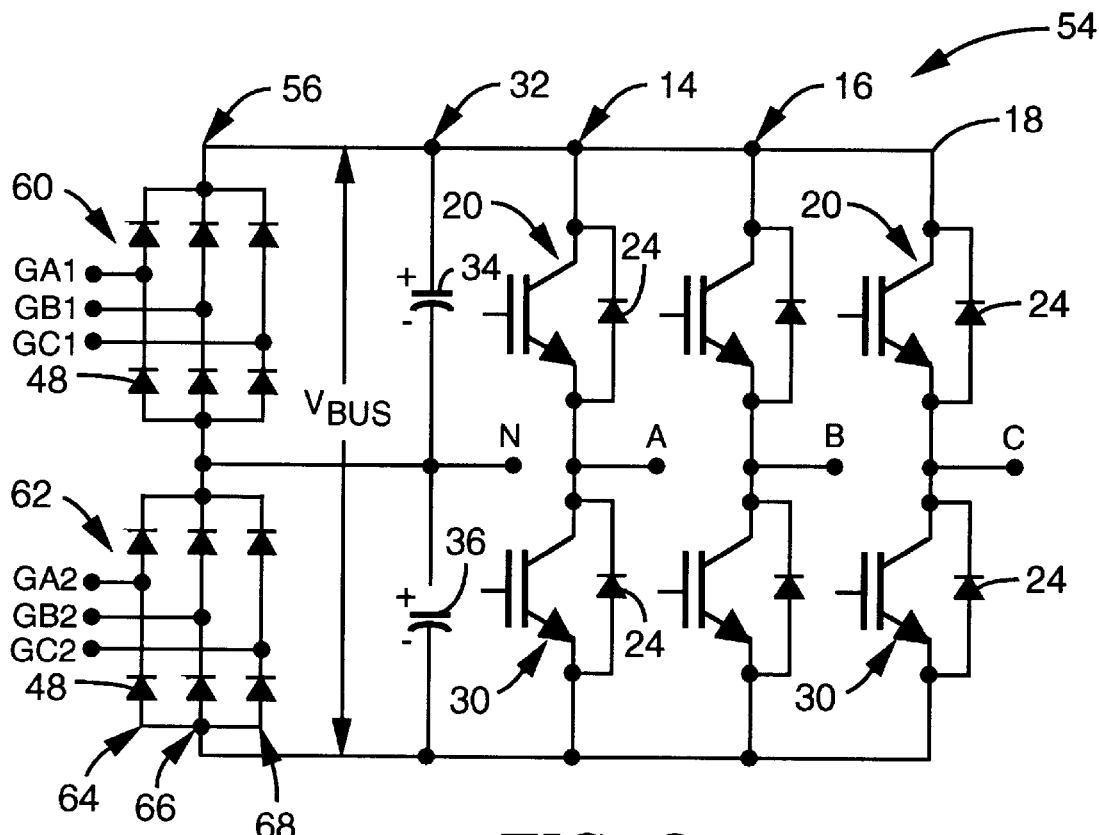
Figure 4:
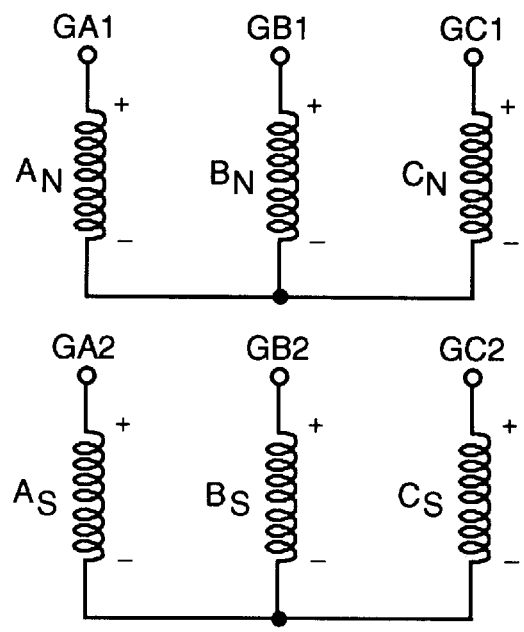
Figure 5:
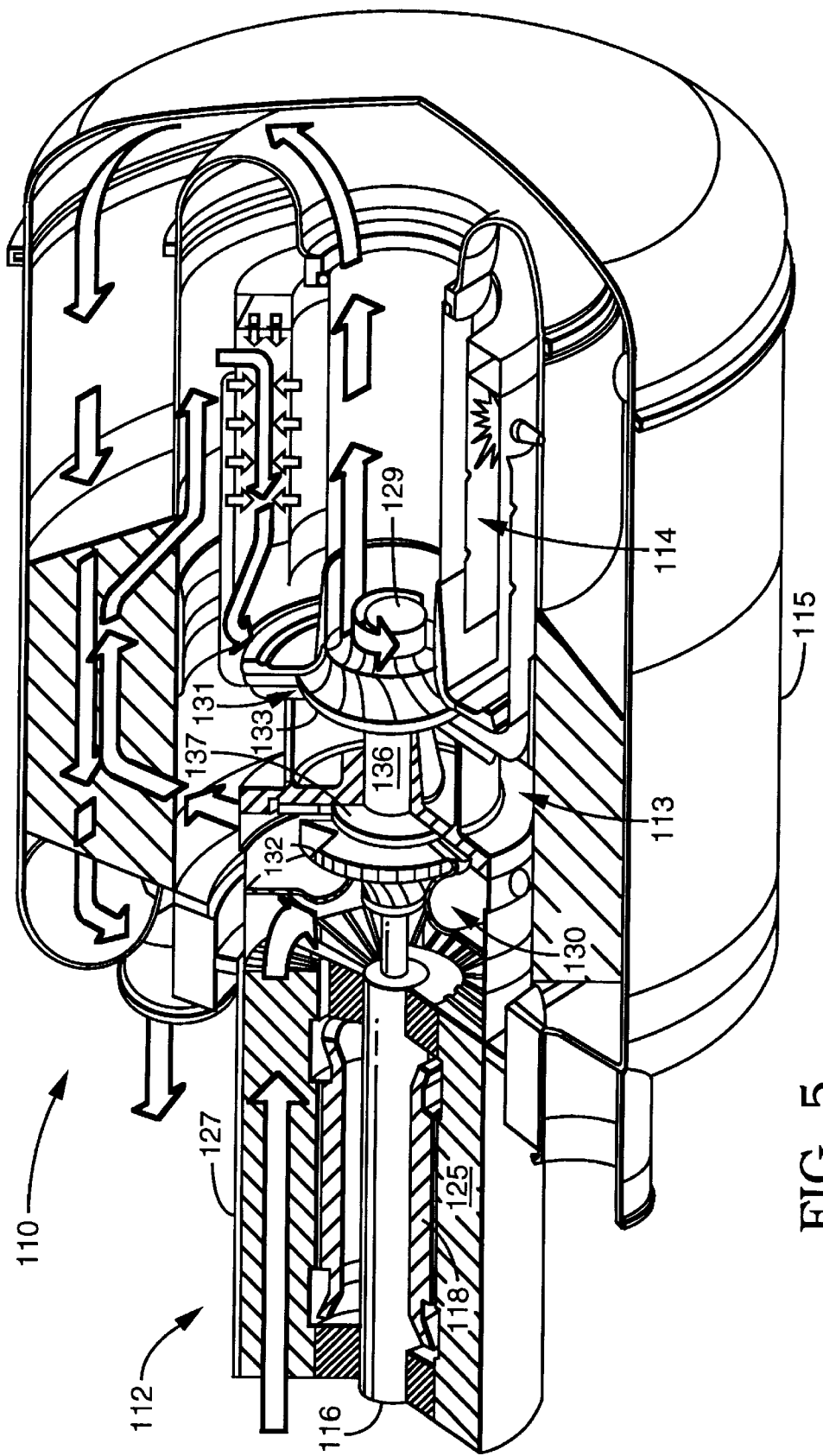
Figure 6:
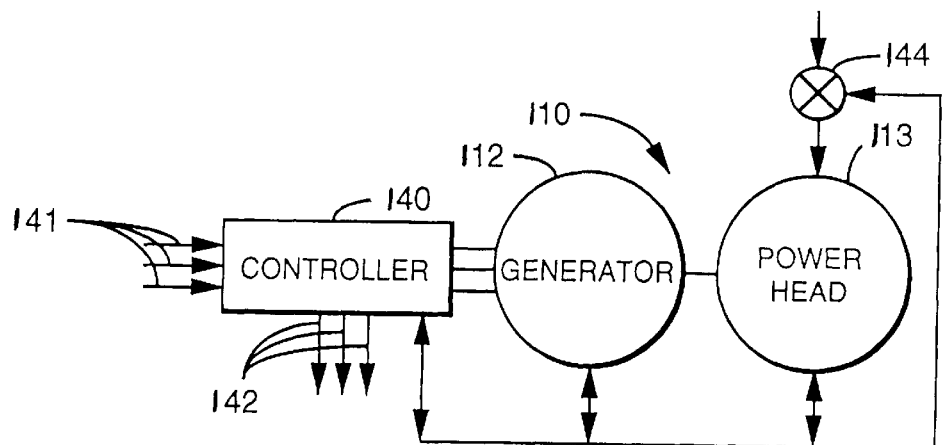
Figure 7:
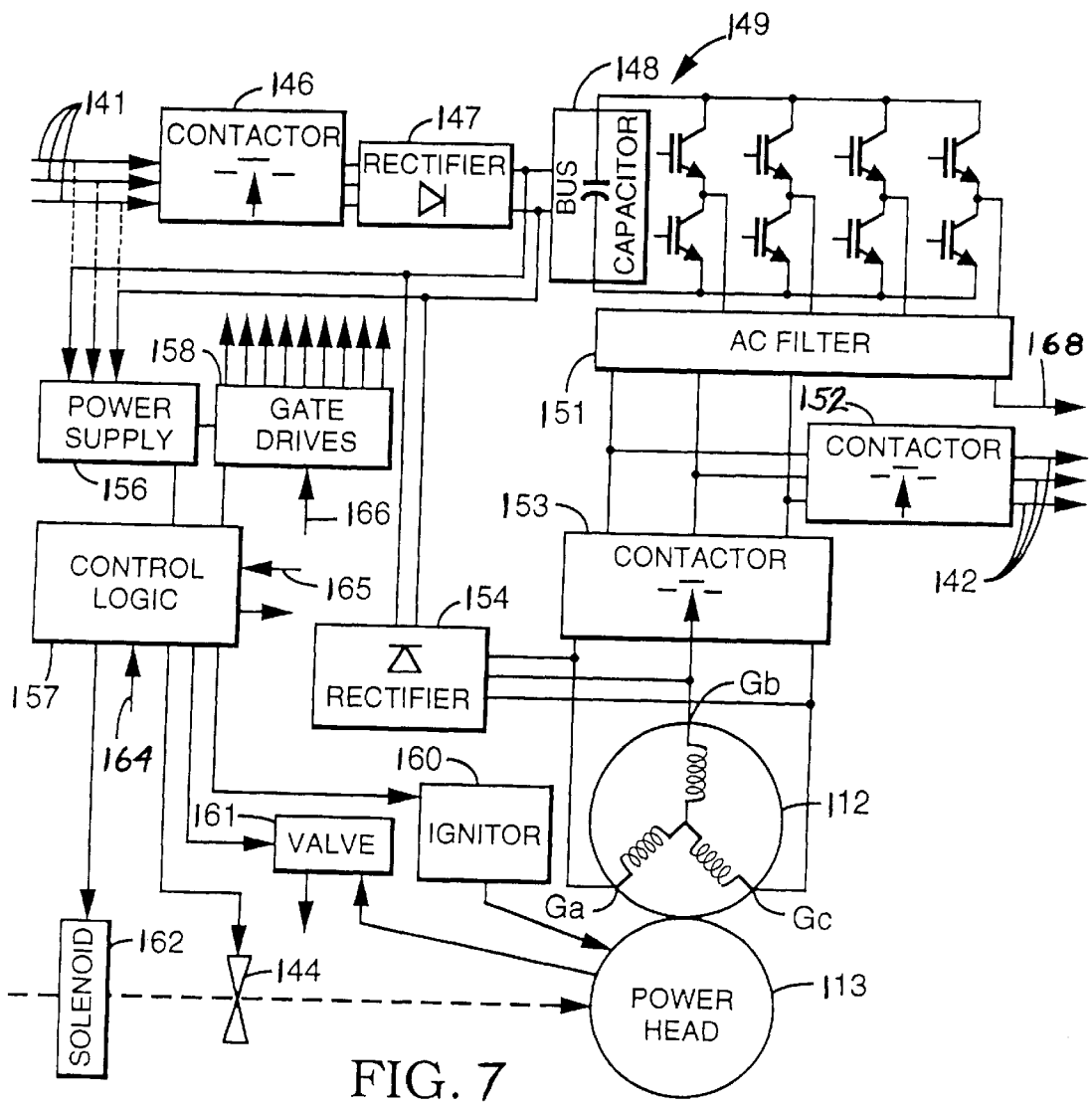

Having thus described the present invention in general terms, reference will now be made to the accompanying drawings in which:

FIG. 1 is schematic view of a current pulse width modulated inverter;

FIG. 2 is a schematic view of a current generator winding;

FIG. 3 is schematic view of the split generator winding pulse width modulated inverter of the present invention;

FIG. 4 is a schematic view of the split generator winding of the present invention;

FIG. 5 is a perspective view, partially cut away, of a permanent magnet turbogenerator/motor utilizing the controller of the present invention;

FIG. 6 is a functional block diagram of the interface between the permanent magnet turbogenerator/motor of FIG. 5 and the controller; and FIG. 7 is a functional block diagram of the permanent magnet turbogenerator/motor controller for use with the permanent magnet turbogenerator/motor of FIG. 5.

DETAILED DESCRIPTION OF THE PREFERRED EMBODIMENTS

A current pulse width modulated inverter 10 is illustrated in FIG. 1. This inverter 10 illustrates four IGBT channels 12, 14, 16, and 18 each across the voltage bus $V_{bus}$, but these may be any number of different solid state switching devices. Each IGBT channel 12, 14, 16, and 18 includes a positive section IGTB 20 with an anti parallel diode 24 and a negative section IGBT with an identical anti parallel diode 24.

This pulse width modulated inverter 10 also includes a capacitor channel 32 also across the voltage bus $V_{bus}$. The capacitor channel 32 includes positive section capacitor 34 and negative section capacitor 36 with the midpoint between positive section capacitor 34 and negative section capacitor 36 connected to the midpoint of IGBT channel 12 through inductor 38. The neutral connection N is at the midpoint of IGBT channel 12 while the midpoints of IGBT channels 14, 16, and 18 provide output connections A, B, and C, respectively.

In addition, this inverter 10 includes a rectifier block channel 39 which is also across the voltage bus $V_{bus}$. This rectifier block channel 39 includes a three phase rectifier block having three (3) diode channels 42, 44, and 46 each including a pair of diodes 48. The midpoints of each pair of diodes 48 are connected to generator windings $G_A$, $G_B$, and $G_C$, respectively.

Current generator windings 50 are illustrated in FIG. 2. Winding A comprises a positive section winding $A_N$ and negative section winding $A_S$ in series with windings B and C each also including a positive section and negative section winding. The generator winding connections $G_A$, $G_B$, and $G_C$ are connected to the three phase rectifier block 40 of FIG. 1.

The pulse width modulated inverter 54 of the present invention is illustrated in FIG. 3. This inverter 54 includes IGBT channels 14, 16, and 18 and capacitor channel 32 from the current inverter 10. Eliminated, however, are IGBT channel 12 and inductor 38. The inverter 54 of the present invention also includes a rectifier block channel 56 across the voltage bus $V_{bus}$. This rectifier block channel 56 includes an positive section three phase rectifier block 60 and a negative section three phase rectifier block 62 with each rectifier block 60 and 62 having three (3) diode channels 64, 66, and 66 each including a pair of diodes 48. The midpoints of positive section diode channels 64, 66, and 68 are connected to generator windings $G_{A1}$, $G_{B1}$, and $G_{C1}$, respectively while the midpoints of negative section diode channels 64, 66, and 68 are connected to generator windings $G_{A2}$, $G_{B2}$, and $G_{C2}$, respectively.

FIG. 4 illustrates the generator windings of the present invention. Rather than having the positive section and negative section windings connected as illustrated in FIG. 2, winding A comprises a separate positive section winding $A_N$ and a separate negative section winding $A_S$ with windings B and C similarly are split into separate positive section and negative section windings. The positive section generator windings $A_N$, $B_N$, and $C_N$ have connections $G_{A1}$, $G_{B1}$, and $G_{C1}$, respectively, connected to positive section three phase rectifier block 60. Similarly, negative section generator windings $A_S$, $B_S$, and $C_S$ have connections $G_{A2}$, $G_{B2}$, and $G_{C2}$, respectively, connected to negative section three phase rectifier block 62.

A permanent magnet turbogenerator/motor 110 is illustrated in FIG. 5 as an example of a turbogenerator/motor utilizing the controller of the present invention. The permanent magnet turbogenerator/motor 110 generally comprises a permanent magnet generator 112, a power head 113, a combustor 114 and a recuperator (or heat exchanger) 115.

The permanent magnet generator 112 includes a permanent magnet rotor or sleeve 116, having a permanent magnet disposed therein, rotatably supported within a permanent magnet generator stator 118 by a pair of spaced journal bearings. Radial permanent magnet generator stator cooling fins 125 are enclosed in an outer cylindrical sleeve 127 to form an annular air flow passage which cools the permanent magnet generator stator 118 and thereby preheats the air passing through on its way to the power head 113.

The power head 113 of the permanent magnet turbogenerator/motor 110 includes compressor 130, turbine 131, and bearing rotor 136 through which the tie rod 129 passes. The compressor 130, having compressor impeller or wheel 132 which receives preheated air from the annular air flow passage in cylindrical sleeve 127 around the permanent magnet stator 118, is driven by the turbine 131 having turbine wheel 133 which receives heated exhaust gases from the combustor 114 supplied with air from recuperator 115.

The compressor wheel 132 and turbine wheel 133 are rotatably supported by bearing shaft or rotor 136 having radially extending bearing rotor thrust disk 137. The bearing rotor 136 is rotatably supported by a single journal bearing within the center bearing housing while the bearing rotor thrust disk 137 at the compressor end of the bearing rotor 136 is rotatably supported by a bilateral thrust bearing. The bearing rotor thrust disk 137 is adjacent to the thrust face at the compressor end of the center bearing housing while a bearing thrust plate is disposed on the opposite side of the bearing rotor thrust disk 137 relative to the center housing thrust face.

Intake air is drawn through the permanent magnet generator 112 by the compressor 130 which increases the pressure of the air and forces it into the recuperator 115. In the recuperator 115, exhaust heat from the turbine 131 is used to preheat the air before it enters the combustor 114 where the preheated air is mixed with fuel and burned. The combustion gases are then expanded in the turbine 131 which drives the compressor 130 and the permanent magnet rotor 116 of the permanent magnet generator 112 which is mounted on the same shaft as the turbine 131. The expanded turbine exhaust gases are then passed through the recuperator 115 before being discharged from the turbogenerator/motor 110.

A functional block diagram of the interface between the generator controller 140 and the permanent magnet turbogenerator/motor 110 for stand alone operation is illustrated in FIG. 6. The generator controller 140 receives power 141 from a source such as a utility to operate the permanent magnet generator 112 as a motor to start the turbine 131 of the power head 113. During the start sequence, the utility power 141 is rectified and a controlled frequency ramp is supplied to the permanent magnet generator 112 which accelerates the permanent magnet rotor 116 and the compressor wheel 132, bearing rotor 136 and turbine wheel 133. This acceleration provides an air cushion for the air bearings and airflow for the combustion process. At about 12,000 rpm, spark and fuel are provided and the generator controller 140 assists acceleration of the turbogenerator 110 up to about 40,000 rpm to complete the start sequence. The fuel control valve 144 is also regulated by the generator controller 140.

Once self sustained operation is achieved, the generator controller 140 is reconfigured to produce 60 hertz, three phase AC (208 volts) 142 from the rectified high frequency AC output (280–380 volts) of the high speed permanent magnet turbogenerator 110. The permanent magnet turbogenerator 110 is commanded to a power set-point with speed varying as a function of the desired output power. For grid connect applications, output 142 is connected to input 141, and these terminals are then the single grid connection.

The functional blocks internal to the generator controller 140 are illustrated in FIG. 7. The generator controller 140 includes in series the start power contactor 146, rectifier 147, DC bus capacitors 148, pulse width modulated (PWM) inverter 149, AC output filter 151, output contactor 152, generator contactor 153, and permanent magnet generator 112. The generator rectifier 154 is connected from between the rectifier 147 and bus capacitors 148 to between the generator contactor 153 and permanent magnet generator 112. The AC power output 142 is taken from the output contactor 152 while the neutral is taken from the AC filter 151.

The control logic section consists of control power supply 156, control logic 157, and solid state switched gate drives illustrated as integrated gate bipolar transistor (IGBT) gate drives 158, but may be any high speed solid state switching device. The control logic 157 receives a temperature signal 164 and a current signal 165 while the IGBT gate drives 158 receive a voltage signal 166. The control logic 157 sends control signals to the fuel cutoff solenoid 162, the fuel control valve 144, the ignitor 160 and release valve 161. AC power 141 is provided to both the start power contactor 146 and in some instances directly to the control power supply 156 in the control logic section of the generator controller 140 as shown in dashed lines.

Utility start power 141, (for example, 208 AC voltage, 3 phase, 60 hertz), is connected to the start power contactor 146 through fuses (not shown). The start power contactor 146 may consist of a first normally open relay and a second normally closed relay, both of which are de-energized at start up. Alternately, both relays may be normally open and the control power supply 156 receives input directly from utility power input 141. Flameproof power resistors can parallel the relays to provide a reduced current (approximately 10 amps maximum) to slowly charge the internal bus capacitors 148 through the rectifier 147 to avoid drawing excessive inrush current from the utility.

Once the bus capacitors 148 are substantially charged, (to approximately 180 VDC, or 80% of nominal), the control power supply 156 starts to provide low voltage logic levels to the control logic 157. Once the control logic microprocessor has completed self tests, coil power is provided to first normally open relay of the start power contactor 146 to fully charge the bus capacitors 148 to full peak line voltage. The bus capacitors 148 can be supplemented for high frequency filtering by additional film type (dry) capacitors.

The PWM inverter 149 operates in two basic modes: a variable voltage (0–190 V line to line), variable frequency (0–700 hertz) constant volts per hertz, three phase mode to drive the permanent magnet generator/motor 112 for start up or cooldown when the generator contactor 152 is closed; or a constant voltage (120 V line to neutral per phase), constant frequency three phase 60 hertz mode. The control logic 157 and IGBT gate drives 158 receive feedback via current signal 165 and voltage signal 166, respectively, as the turbine generator is ramped up in speed to complete the start sequence. The PWM inverter 149 is then reconfigured to provide 60 hertz power, either as a current source for grid connect, or as a voltage source.

The generator contactor 153 connects the permanent magnet generator 112 to the inverter 149 during the start sequence. Initial starting current approximates nominal operating current for about 2 seconds then reduces to a lower value for the balance of the acceleration period. After the start sequence is completed, the generator 112 produces enough output voltage at the output terminals of the generator rectifier 154 to provide three phase regulated output from the inverter 149, so both the start contactor 146 and generator contractor are opened and the system is then self sustaining.

During startup of the permanent magnet turbogenerator/motor 110, both the start power contactor 146 and the generator contactor 153 are closed and the output contactor 152 is open. Once self sustained operation is achieved, the start power contactor 146 and the generator contactor 153 are opened and the PWM inverter 149 is reconfigured to a controlled 60 hertz mode. After the reconfiguration of the PWM inverter 149, the output contactor 152 is closed to connect the AC output 142. The start power contactor 146 and generator contactor 153 will remain open.

The PWM inverter 149 is truly a dual function inverter which is used both to start the permanent magnet turbogenerator/motor 110 and is also used to convert the permanent magnet turbogenerator/motor output to utility power, either sixty hertz, three phase for stand alone applications, or as a current source device. With start power contactor 146 closed, single or three phase utility power is brought through the start power contactor 146 to be able to operate into a bridge rectifier 147 and provide precharged power and then start voltage to the bus capacitors 148 associated with the PWM inverter 149. This allows the PWM inverter 149 to function as a conventional adjustable speed drive motor starter to ramp the permanent magnet turbogenerator/motor 110 up to a speed sufficient to start the gas turbine 131.

An additional rectifier 154, which operates from the output of the permanent magnet turbogenerator/motor 110, accepts the three phase, up to 380 volt AC from the permanent magnet generator/motor 112 which at full speed is 1600 hertz and is classified as a fast recovery diode rectifier bridge. Six diode elements arranged in a classic bridge configuration comprise this high frequency rectifier 154 which provides output power at DC. The rectified voltage is as high as 550 volts under no load.

The permanent magnet turbogenerator/motor 110 is basically started at zero frequency and rapidly ramps up to approximately 12,000 rpm. This is a two pole permanent magnet generator/motor 112 and as a result 96,000 rpm equals 1,600 hertz. Therefore 12,000 rpm is ⅛th of that or 200 hertz. It is operated on a constant volt per hertz ramp, in other words, the voltage that appears at the output terminals is ⅛th of the voltage that appears at the output terminals under full speed.

Approximate full speed voltage is 380 volts line to line so it would be approximately ⅛th of that. When the PWM inverter 149 has brought the permanent magnet turbogenerator/motor 110 up to speed, the fuel solenoid 162, fuel control valve 144 and ignitor 160 cooperate to allow the combustion process to begin. Using again the adjustable speed drive portion capability of the PWM inverter 149, the permanent magnet turbogenerator/motor 110 is then accelerated to approximately 35,000 or 40,000 rpm at which speed the gas turbine 131 is capable of self sustaining operation.

The AC filter 151 is a conventional single pass LC filter which simply removes the high frequency, in this case approximately twenty kilohertz, switching component. Because the voltage in start mode is relatively low, its rectified 208 volt line which is approximately 270 volts, a single bus capacitor 148 is capable of standing that voltage. However, when in generate mode, the DC output of the generator rectifier 154 can supply voltages as high as 550 volts DC, requiring two capacitors to be series connected to sustain that voltage.

The reconfiguration or conversion of the PWM inverter 149 to be able to operate as a current source synchronous with the utility grid is accomplished by first stopping the PWM inverter 149. The AC output or the grid connect point is monitored with a separate set of logic monitoring to bring the PWM inverter 149 up in a synchronized fashion. The generator contactor 153 functions to close and connect only when the PWM inverter 149 needs to power the permanent magnet turbogenerator/motor 110 which is during the start operation and during the cool down operation. The output contactor 152 is only enabled to connect the PWM inverter 149 to the grid once the PWM inverter 149 has synchronized with grid voltage.

The implementation of the control power supply 156 first drops the control power supply 156 down to a 24 volt regulated section to allow an interface with a battery or other control power device. The control power supply 156 provides the conventional logic voltages to both the IGBT gate drives 158 and control logic 157. The IGBT gate drives 158 have two isolated low voltage sources to provide power to each of the two individual IGBT drives and the interface to the IGBT transistors is via a commercially packaged chip.

This system is also capable of generating 480 volt output directly. By changing the winding in the permanent magnet generator/motor 112, the voltage ratings of the IGBTs, and the bus capacitors 148, the system is then capable of operating directly at 480 volts, starting from grid voltage with 480 volts, and powering directly to 480 volts without requiring a transformer.

In this manner, the neutral can be readily established without the need for additional expensive solid state components.

While specific embodiments of the invention have been illustrated and described, it is to be understood that these are provided by way of example only and that the invention is not to be construed as being limited thereto but only by the proper scope of the following claims.

What we claim is:

1. A controller for a permanent magnet turbogenerator/motor having a gas turbine engine, comprising:

a pulse width modulated inverter operably associated with said permanent magnet turbogenerator/motor, said permanent magnet turbogenerator/motor having positive section magnetic windings and separate equal negative section magnetic windings;

means to provide electrical power to said permanent magnet turbogenerator/motor through said pulse width modulated inverter to drive said permanent magnet turbogenerator/motor as a motor to accelerate said gas turbine engine of said permanent magnet turbogenerator/motor;

means to provide spark and fuel to said gas turbine engine of said permanent magnet turbogenerator/motor during this acceleration to achieve self sustaining operation of said gas turbine engine;

means to disconnect the electrical power from said pulse width modulated inverter and said permanent magnet turbogenerator/motor once self sustaining operation of said gas turbine engine is achieved;

a rectifier bridge operably associated with said pulse width modulated inverter and said permanent magnet turbogenerator/motor, said rectifier bridge having a positive section connected to said positive section magnetic windings and a negative section connected to said separate equal negative section magnetic windings; and means to reconnect said pulse width modulated inverter to said permanent magnet turbogenerator/motor through said rectifier bridge to reconfigure said pulse width modulated inverter to supply three phase, four wire, utility voltage.

2. A controller for a permanent magnet turbogenerator/motor having a gas turbine engine and a permanent magnet generator/motor, comprising:

a pulse width modulated inverter operably associated with said permanent magnet turbogenerator/motor, said pulse width modulated inverter having a plurality of solid state switching device channels and said permanent magnet turbogenerator/motor having positive section magnetic windings and separate negative section magnetic windings said separate negative section magnetic windings equal to said positive section magnetic windings;

a first contactor operably associated with said pulse width modulated inverter;

a second contactor operable associated with said the permanent magnet turbogenerator/motor;

means to provide electrical power to said pulse width modulated inverter through said first contactor when closed to drive said permanent magnet turbogenerator/motor as a motor through said second contactor when closed to accelerate said gas turbine engine of said permanent magnet turbogenerator/motor;

means to provide spark and fuel to said gas turbine engine of said permanent magnet turbogenerator/motor during this acceleration to achieve self sustaining operation of said gas turbine engine;

means to open said first and second contactors to disconnect the electrical power from said pulse width modulated inverter once self sustaining operation is achieved;

a rectifier bridge operable associated with said pulse width modulated inverter and said permanent magnet turbogenerator/motor, said rectifier bridge having a positive section connected to said positive section magnetic windings and a negative section connected to said separate negative section magnetic windings;

a third contactor operably associated with said pulse width modulated inverter;

means to reconnect said pulse width modulated inverter to said permanent magnet turbogenerator/motor through said rectifier bridge to reconfigure said pulse width modulated inverter; and means to connect said reconfigured pulse width modulated inverter to supply three phase, four wire utility voltage to a load through said third contactor when closed.

3. The controller for a permanent magnet turbogenerator/motor of claim 2 wherein the number of solid state switching device channels in said pulse width modulated inverter is three.

4. The controller for a permanent magnet turbogenerator/motor of claim 3 wherein the three solid state switching device channels are IGBT channels.

5. The controller for a permanent magnet turbogenerator/motor of claim 2 wherein said positive section rectifier bridge is a three phase rectifier bridge having three diode channels and said negative section rectifier bridge is a three phase rectifier bridge having three diode channels.

6. The controller for a permanent magnet turbogenerator/motor of claim 5 wherein each of said diode channels includes a pair of diodes and said positive section magnetic windings are connected to said positive section of said rectifier bridge between each of said pair of diodes and said negative section magnetic windings are connected to said negative section of said rectifier bridge between each of said pair of diodes.

* * * * *

UNITED STATES PATENT AND TRADEMARK OFFICE
CERTIFICATE OF CORRECTION

PATENT NO. : 6,020,713
DATED : February 1, 2000
INVENTOR(S) : Everett R. Geis, et. al.

It is certified that error appears in the above-identified patent and that said Letters Patent is hereby corrected as shown below:

Column 2, line 34, after "is" insert --a--
Column 2, line 37, after "is" insert --a--
Column 2, line 59, change "IGTB" to --IGBT--
Column 3, line 26, change "an" to --a--
Column 3, line 29, change ""66" (second occurrence) to --68--
Column 8, line 7, after "windings" insert --,--

Signed and Sealed this

Fourteenth Day of November, 2000

Q. TODD DICKINSON

*Attest:*

*Attesting Officer*          *Director of Patents and Trademarks*